United States Patent
Liu et al.

(10) Patent No.: US 10,217,005 B2
(45) Date of Patent: Feb. 26, 2019

(54) METHOD, APPARATUS AND DEVICE FOR GENERATING TARGET DETECTION INFORMATION

(71) Applicants: NEUSOFT CORPORATION, Shenyang (CN); NEUSOFT REACH AUTOMOTIVE TECHNOLOGY (SHANGHAI) CO., LTD., Shanghai (CN)

(72) Inventors: Wei Liu, Shenyang (CN); Xin Yang, Shenyang (CN); Lu Wei, Shenyang (CN)

(73) Assignees: NEUSOFT CORPORATION, Shenyang (CN); NEUSOFT REACH AUTOMOTIVE TECHNOLOGY (SHANGHAI) CO., LTD., Shanghai (CN)

( * ) Notice: Subject to any disclaimer, the term of this patent is extended or adjusted under 35 U.S.C. 154(b) by 71 days.

(21) Appl. No.: 15/628,667

(22) Filed: Jun. 21, 2017

(65) Prior Publication Data

US 2018/0189575 A1   Jul. 5, 2018

(30) Foreign Application Priority Data

Dec. 30, 2016   (CN) .......................... 2016 1 1259559

(51) Int. Cl.
*G06K 9/00* (2006.01)
*G01C 11/04* (2006.01)
(Continued)

(52) U.S. Cl.
CPC .......... *G06K 9/00791* (2013.01); *G01C 11/04* (2013.01); *G01S 13/726* (2013.01);
(Continued)

(58) Field of Classification Search
CPC ........... G06K 9/00791; G06K 9/00805; G06K 9/6201; G06K 9/6215; G06K 9/6288;
(Continued)

(56) References Cited

U.S. PATENT DOCUMENTS

| 2007/0080850 | A1  | 4/2007 | Abe et al. | |
| 2013/0236047 | A1* | 9/2013 | Zeng et al. | G01S 13/726 382/103 |
| 2015/0260498 | A1* | 9/2015 | Soohoo | G01B 5/004 73/1.79 |

FOREIGN PATENT DOCUMENTS

| JP | H07244162 A | 9/1995 |
| JP | 2005084034 A | 3/2005 |

(Continued)

OTHER PUBLICATIONS

JP First Office Action dated Jul. 3, 2018 in the corresponding JP application (application No. 2017-131665).

*Primary Examiner* — Andrew W Johns
(74) *Attorney, Agent, or Firm* — Kilpatrick Townsend & Stockton LLP

(57) ABSTRACT

Provided is a method for generating target detection information, including detecting target objects around the vehicle by multiple different types of sensors, and determining the detection targets representing a same target object, detected by the different types of sensors, by spatial position and time tracing. With taking the target object as the detection result, the target detection information generated for the detection result includes a spatial matching confidence of the detection result in the current detection period, a time matching confidence of the detection result, and target detection information on each of the detection targets representing the detection result, collected by the sensor detecting the detection target in a dimension corresponding to the sensor.

14 Claims, 6 Drawing Sheets

(51) Int. Cl.
  *G01S 13/91*  (2006.01)
  *G01S 13/72*  (2006.01)
  *G01S 13/86*  (2006.01)
  *G06K 9/62*   (2006.01)

(52) U.S. Cl.
  CPC .......... *G01S 13/865* (2013.01); *G01S 13/867* (2013.01); *G01S 13/91* (2013.01); *G06K 9/6215* (2013.01); *G06K 2209/21* (2013.01)

(58) Field of Classification Search
  CPC ................ G06K 9/6289; G06K 9/6293; G01T 2207/20221; G01T 2207/30261; G01S 7/411; G01S 7/412; G01S 7/4802; G01S 7/4808; G01S 13/726; G01S 13/865; G01S 13/867; G01S 13/93; G01S 13/931; G01S 17/023; G01S 17/026; G01S 17/06; G01S 17/87; G01S 17/93; G01S 17/936
  See application file for complete search history.

(56) References Cited

FOREIGN PATENT DOCUMENTS

| | | |
|---|---|---|
| JP | 2007188354 A | 7/2007 |
| JP | 2010249613 A | 11/2010 |
| JP | 2015031607 A | 2/2015 |
| JP | 2015203677 A | 11/2015 |
| WO | 2017057041 A1 | 4/2017 |

\* cited by examiner

METHOD, APPARATUS AND DEVICE FOR GENERATING TARGET DETECTION INFORMATION

This application claims priority to Chinese patent application No. 201611259559.1 titled "METHOD, APPARATUS AND DEVICE FOR GENERATING TARGET DETECTION INFORMATION" and filed with the Chinese State Intellectual Property Office on Dec. 30, 2016, which is incorporated herein by reference in its entirety.

FIELD

The present disclosure relates to the field of information processing technology, and particularly to a method, an apparatus and a device for generating target detection information.

BACKGROUND

With development of electronization and intelligentization of vehicles, many different types of sensors are arranged on the vehicles, to sense surrounding environment and detect target objects around the vehicle. Different types of sensors detect target objects according to different detection mechanisms, and thus have different advantages and disadvantages. Conventionally, target objects around the vehicle are detected by a single type of sensor, that is, target detection information for describing characteristics of the target object is collected by a same sensor. However, the inventor found that target detection information in some dimensions may cannot be collected by a single type of sensor or the collected target detection information in some dimensions may not be accurate, or even in some cases the target object cannot be detected. Therefore, by using a single type of sensor to detect target objects, false detection or missing detection may occur, and accurate and complete target detection information in multiple dimensions cannot be obtained.

SUMMARY

A technical problem to be solved by the present disclosure is to provide a method, an apparatus and a device for generating target detection information, to reduce false detection rate and missing detection rate of target objects, and provide accurate and complete target detection information in multiple dimensions.

In an aspect, it is provided a method for generating target detection information, including:

determining, in a unified plane coordinate system, spatial positions of initial detection targets detected by a plurality of different types of sensors in a current detection period;

matching spatial positions of initial detection targets to be matched detected by every two of the plurality of different types of sensors in the current detection period, and determining the initial detection targets under a detection result as result detection targets, wherein spatial positions of any two of the result detection targets under the detection result are matched with each other; and generating target detection information of the detection result, wherein the target detection information of the detection result comprises target detection information on each of the result detection targets, which is collected by the sensor detecting the result detection target in a dimension corresponding to the sensor, and each of the result detection targets is the initial detection target detected by the sensor.

Optionally, the method further includes: calculating a spatial matching confidence of the detection result in the current detection period based on the number of successful matches among the spatial positions of all the result detection targets in the current detection period, wherein the target detection information of the detection result further comprises the spatial matching confidence of the detection result in the current detection period.

Optionally, generating target detection information of the detection result includes: generating the target detection information of the detection result in a case that the spatial matching confidence of the detection result in the current detection period is greater than a preset spatial confidence threshold.

Optionally, the method further includes: determining a time matching confidence of the detection result by performing a weighting operation on spatial matching confidences of the detection result in a plurality of recent detection periods, wherein the target detection information of the detection result further comprises the time matching confidence of the detection result.

Optionally, generating target detection information of the detection result includes: generating the target detection information of the detection result in a case that the time matching confidence of the detection result is greater than a preset time confidence threshold.

Optionally, it is determined that spatial positions of two of the initial detection targets to be matched are matched with each other, in a case that a Euclidean distance between the spatial positions of the two of the initial detection targets to be matched is within a preset distance threshold.

Optionally, the method further includes:

determining a screening range in the plane coordinate system based on a current speed of a vehicle; and determining the initial detection targets to be matched based on the screening range, wherein spatial positions of the initial detection targets to be matched are within the screening range.

Optionally, the screening range is a range of all spatial positions able to be passed by the vehicle in a case that a turning radius exceeds a current radius threshold and a path does not exceed a current path threshold, wherein the current radius threshold is determined based on the current speed of the vehicle and a lateral acceleration threshold, and the current path threshold is determined based on the current speed of the vehicle and a preset time threshold.

Optionally, the spatial matching confidence of the detection result in the current detection period is a ratio of the number of successful matches corresponding to the detection result to the total number of matches, wherein the number of successful matches corresponding to the detection result is the number of successful matches among the spatial positions of all the result detection targets in the current detection period, and the total number of matches is the number of matches among all the initial detection targets to be matched in the current detection period.

Optionally, determining the time matching confidence of the detection result by performing the weighting operation on the spatial matching confidences of the detection result in the plurality of recent detection periods comprises:

adding results obtained by multiplying a spatial matching confidence in each of the plurality of recent detection periods by a weighting coefficient corresponding to the detection period, to obtain the time matching confidence of the detection result, wherein the closer the detection period is to a current time instant, the greater the weighting coefficient corresponding to the detection period is.

Optionally, the weighting coefficient corresponding to each of the detection periods is a normalized weighting coefficient.

Optionally, the multiple different types of sensors include a camera, a radar and/or a laser radar. A dimension corresponding to the camera is an image characteristic of the detected target object, a dimension corresponding to the radar is a relative speed of the detected target object with respect to the vehicle, and a dimension corresponding to the laser radar is a profile of the detected target object.

In another aspect, it is provided an apparatus for generating target detection information, including:

a first determining unit configured to determine, in a unified plane coordinate system, spatial positions of initial detection targets detected by a plurality of different types of sensors in a current detection period;

a second determining unit configured to match spatial positions of initial detection targets to be matched detected by every two of the plurality of different types of sensors in the current detection period, and determine the initial detection targets under a detection result as result detection targets, wherein spatial positions of any two of the result detection targets under the detection result are matched with each other; and a generating unit configured to generate target detection information of the detection result, wherein the target detection information of the detection result comprises target detection information on each of the result detection targets, which is collected by the sensor detecting the result detection target in a dimension corresponding to the sensor, and each of the result detection targets is the initial detection target detected by the sensor.

Optionally, the apparatus may further include a calculating unit, configured to calculate a spatial matching confidence of the detection result in the current detection period based on the number of successful matches among the spatial positions of all the result detection targets in the current detection period. The target detection information of the detection result further includes the spatial matching confidence of the detection result in the current detection period.

Optionally, the generating unit is configured to generate target detection information of the detection result in a case that the spatial matching confidence of the detection result in the current detection period is greater than a preset spatial confidence threshold.

Optionally, the apparatus may further include a third determining unit, configured to determine a time matching confidence of the detection result by performing a weighting operation on spatial matching confidences of the detection result in multiple recent detection periods.

The target detection information of the detection result further includes the time matching confidence of the detection result.

Optionally, the generating unit is configured to generate target detection information of the detection result in a case that the time matching confidence of the detection result is greater than a preset time confidence threshold.

Optionally, in a case that a Euclidean distance between spatial positions of two initial detection targets to be matched is within a preset distance threshold, it is determined that the spatial positions of the two initial detection targets to be matched are matched with each other.

Optionally, the apparatus may further include: a fourth determining unit configured to determine a screening range in the plane coordinate system based on a current speed of a vehicle; and a fifth determining unit configured to determine initial detection targets to be matched based on the screening range. Spatial positions of the initial detection targets to be matched are located within the screening range.

Optionally, the screening range is a range of all possible spatial positions passed by the vehicle in a case that a turning radius of the vehicle does not exceed a current radius threshold and a path of the vehicle does not exceed a current path threshold. The current radius threshold is determined based on the current speed of the vehicle and a lateral acceleration threshold, and the current path threshold is determined based on the current speed of the vehicle and a preset time threshold.

Optionally, the spatial matching confidence of the detection result in the current detection period may be a ratio of the number of successful matches corresponding to the detection result to the total number of matches, wherein the number of successful matches corresponding to the detection result is the number of successful matches among the spatial positions of all the result detection targets in the current detection period, and the total number of matches is the number of matches among all the initial detection targets to be matched in the current detection period.

Optionally, the third determining unit is configured to add results obtained by multiplying a spatial matching confidence in each of the plurality of recent detection periods by a weighting coefficient corresponding to the detection period, to obtain the time matching confidence of the detection result. The closer the detection period is to a current time instant, the greater the weighting coefficient corresponding to the detection period is Optionally, the weighting coefficient corresponding to each of the detection periods may be a normalized weighting coefficient.

Optionally, the multiple different types of sensors include a camera, a radar and/or a laser radar. A dimension corresponding to the camera is an image characteristic of the detected target object, a dimension corresponding to the radar is a relative speed of the detected target object with respect to the vehicle, and a dimension corresponding to the laser radar is a profile of the detected target object.

In another aspect, it is provided a device for generating target detection information, comprising a processor, a storage, a communication interface and a bus system, wherein the bus system is configured to couple the processor, the storage and the communication interface together;

the communication interface is configured to implement communication connection between the device and at least one other device;

the storage is configured to storage instructions; and the processor is configured to read the instructions stored in the storage, to perform steps of:

determining, in a unified plane coordinate system, spatial positions of initial detection targets detected by a plurality of different types of sensors in a current detection period;

matching spatial positions of initial detection targets to be matched detected by every two of the plurality of different types of sensors in the current detection period, and determining the initial detection targets under a detection result as result detection targets, wherein spatial positions of any two of the result detection targets under the detection result are matched with each other; and generating target detection information of the detection result, wherein the target detection information of the detection result comprises target detection information on each of the result detection targets, which is collected by the sensor detecting the result detection target in a dimension corresponding to the sensor, and each of the result detection targets is the initial detection target detected by the sensor.

Optionally, the processor is further configured to calculate a spatial matching confidence of the detection result in the current detection period based on the number of successful matches among the spatial positions of all the result detection targets in the current detection period. The target detection information of the detection result further includes the spatial matching confidence of the detection result in the current detection period.

Optionally, in order to generate the target detection information of the detection result, the processor is further configured to generate target detection information of the detection result in a case that the spatial matching confidence of the detection result in the current detection period is greater than a preset spatial confidence threshold.

Optionally, the processor is further configured to determine a time matching confidence of the detection result by performing a weighting operation on spatial matching confidences of the detection result in multiple recent detection periods. The target detection information of the detection result further includes the time matching confidence of the detection result.

Optionally, in order to generate the target detection information of the detection result, the processor is further configured to generate the target detection information of the detection result in a case that the time matching confidence of the detection result is greater than a preset time confidence threshold.

Optionally, in a case that a Euclidean distance between spatial positions of two initial detection targets to be matched is within a preset distance threshold, it is determined that the spatial positions of the two initial detection targets to be matched are matched with each other.

Optionally, the processor is further configured to: determine a screening range in the plane coordinate system based on a current speed of a vehicle; and determine the initial detection targets to be matched based on the screening range. Spatial positions of the initial detection targets to be matched are located within the screening range.

Optionally, the screening range is a range of all possible spatial positions passed by the vehicle in a case that a turning radius of the vehicle does not exceed a current radius threshold and a path of the vehicle does not exceed a current path threshold. The current radius threshold is determined based on the current speed of the vehicle and a lateral acceleration threshold, and the current path threshold is determined based on the current speed of the vehicle and a preset time threshold.

Optionally, the spatial matching confidence of the detection result in the current detection period may be a ratio of the number of successful matches corresponding to the detection result to the total number of matches. The number of successful matches corresponding to the detection result is the number of successful matches among the spatial positions of all the result detection targets in the current detection period, and the total number of matches is the number of matches among all the initial detection targets to be matched in the current detection period.

Optionally, in order to determine the time matching confidence of the detection result, the processor is further configured to obtain the time matching confidence of the detection result by multiplying the spatial matching confidence in each of the multiple recent detection periods with a weighting coefficient corresponding to the detection period and adding the obtained products together. The closer the detection period is to a current time instant, the greater the weighting coefficient corresponding to the detection period is.

Optionally, the weighting coefficient corresponding to each of the detection periods is a normalized weighting coefficient.

Optionally, the multiple different types of sensors include a camera, a radar and/or a laser radar. A dimension corresponding to the camera is an image characteristic of the detected target object, a dimension corresponding to the radar is a relative speed of the detected target object with respect to the vehicle, and a dimension corresponding to the laser radar is a profile of the detected target object.

According to embodiments of the present disclosure, target objects around the vehicle are detected by multiple different types of sensors, and the detection targets representing a same target object, which are detected by the different types of sensors, are determined by spatial position matching. A spatial matching confidence is calculated, and a time matching confidence is calculated by tracing the detection targets over time. With taking the target object as a detection result, the target detection information generated for the detection result includes a spatial matching confidence of the detection result in the current detection period, a time matching confidence of the detection result, and target detection information on each of the detection targets representing the detection result, where the target detection information on the detection target is collected by the sensor detecting the detection target in a dimension corresponding to the sensor. It can be seen that, on one hand, the possibility that the detection targets detected by different types of sensors presents a same target object can be determined according to the spatial matching confidence and the time matching confidence, and false detection or missing detection for the target object is greatly reduced in view of different advantages of different sensors. On the other hand, according to the dimensions of the target detection information that can be accurately collected by the different types of sensors, target detection information accurately collected by different types of sensors in different dimensions is fused to obtain target detection information on the same target object, thereby providing more accurate and completer target detection information on the target object.

BRIEF DESCRIPTION OF THE DRAWINGS

In order to clearly illustrate the technical solutions in the embodiments of the present disclosure, in the following, drawings used in the description of the embodiments will be introduced simply. Apparently, the drawings in the following description are only some embodiments of the present disclosure. Other drawings can also be obtained by those skilled in the art according to the drawings.

DETAILED DESCRIPTION OF THE EMBODIMENTS

Figure 1:
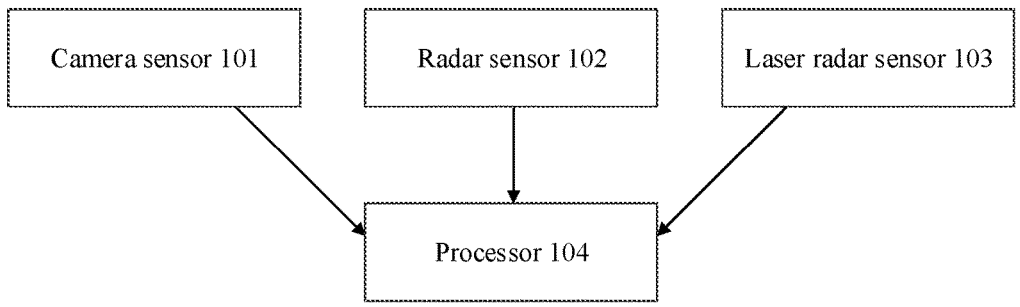
FIG. 1 is a schematic diagram of a system framework related to an application scenario according to an embodiment of the present disclosure.

In order to make those skilled in the art better understand the solution of the present disclosure, hereinafter, the technical solutions in the embodiments of the present disclosure will be described clearly and completely in conjunction with the drawings in the embodiments of the present disclosure. Apparently, the described embodiments are only a part of the embodiments of the present disclosure, rather than all the embodiments. All the other embodiments obtained by those skilled in the art based on the embodiments of the present disclosure without creative work will fall within the protection scope of the present disclosure.

The invertor, through research, found that different types of sensors detect a target object according to different detection mechanisms, and thus the different types of sensors have different detection advantages and disadvantages. For example, a camera sensor detects a target object by acquiring visual imaging through a camera, and the viewing angle can reaches a range from −90 degrees to +90 degrees. For another example, a radar sensor detects a target object by comparing a transmitted electromagnetic wave with a received electromagnetic wave, the long-distance detection can reach 200 meters and a range from −10 degrees to +10 degrees, and the middle-distance detection can reach 50 meters and a range from −45 degrees to +45 degrees. For another example, a laser radar sensor detects a target object by scanning the target object through laser beam, and the detection can reach 200 meter and a range from −45 degrees to +45 degrees under good conditions. Conventionally, the target objects around the vehicle are detected by a single type of sensor, and the single type of sensor certainly has some detection disadvantages when detecting the target objects around the vehicle. For example, target detection information in some dimensions may cannot be collected by a single type of sensor or the collected target detection information in some dimensions may not be accurate, or even in some cases the target object cannot be detected. Therefore, by using a single type of sensor to detect target objects, false detection or missing detection may occur, and accurate and complete target detection information in multiple dimensions cannot be obtained.

In order to solve the problem, in the embodiments of the present disclosure, target objects around the vehicle are detected by multiple different types of sensors, and the detection targets representing a same target object, which are detected by the different types of sensors, are determined by spatial position matching. With taking the target object as a detection result, the target detection information generated for the detection result includes a spatial matching confidence of the detection result in the current detection period, a time matching confidence of the detection result, and target detection information on each of the detection targets representing the detection result, where the target detection information on the detection target is collected by the sensor detecting the detection target in a dimension corresponding to the sensor. It can be seen that, on one hand, the possibility that the detection targets detected by different types of sensors presents a same target object can be determined according to the spatial matching confidence and the time matching confidence, and false detection or missing detection for the target object is greatly reduced in view of different advantages of different sensors. On the other hand, according to the dimensions of the target detection information that can be accurately collected by the different types of sensors, target detection information accurately collected by different types of sensors in different dimensions is fused to obtain target detection information on the same target object, thereby providing more accurate and completer target detection information on the target object.

FIG. 1 illustrates a scenario according to an embodiment of the present disclosure. The scenario includes a camera sensor 101, a radar sensor 102, a laser radio sensor 103 and a processor 104. The camera sensor 101 can interact with the processor 104, the radar sensor 102 can interact with the processor 104, and the laser radio sensor 103 can interact with the processor 104. The processor 104 determines, in a unified plane coordinate system, spatial positions of initial detection targets detected by each of the camera sensor 101, the radar sensor 102 and the laser radar sensor 103 in a current detection period. The processor 104 matches spatial positions of the initial detection targets to be matched collected by the camera sensor 101 and the radar sensor 102, spatial positions of the initial detection targets to be matched collected by the radar sensor 102 and the laser radar sensor 103 and spatial positions of the initial detection targets to be matched collected by the camera sensor 101 and the laser radar sensor 103 in the current detection period, and determines initial detection targets under a detection result as result detection targets, where spatial positions of any two result detection targets under the detection result are matched with each other. The processor 104 further calculates a spatial matching confidence of the detection result in the current detection period based on the number of successful matches among the spatial positions of the result detection targets in the current detection period. The processor 104 further determines a time matching confidence of the detection result by performing a weighting operation on spatial matching confidences of the detection result in multiple recent detection periods. The processor 104 generates target detection information of the detection result. The target detection information of the detection result includes the spatial matching confidence of the detection result in the current detection period, a time matching confidence of the detection result, and target detection information on each of the result detection targets, which is collected by the sensor detecting the result detection target in a dimension corresponding to the sensor. The result detection targets are the initial detection targets detected by the sensors.

The actions according to the embodiment of the present disclosure are executed by the processor 104 in the above scenario, however, the executive subject in the present disclosure is not limited thereto, as long as the actions according to the embodiment of the present disclosure are performed.

It should be noted that the above scenario is only an example of the scenarios of the present disclosure, and the present disclosure is not limited to the above scenario.

A method, an apparatus and a device for generating target detection information according to embodiments of the present disclosure are described in detail below in conjunction with the drawings.

Exemplary Methods

Figure 2:
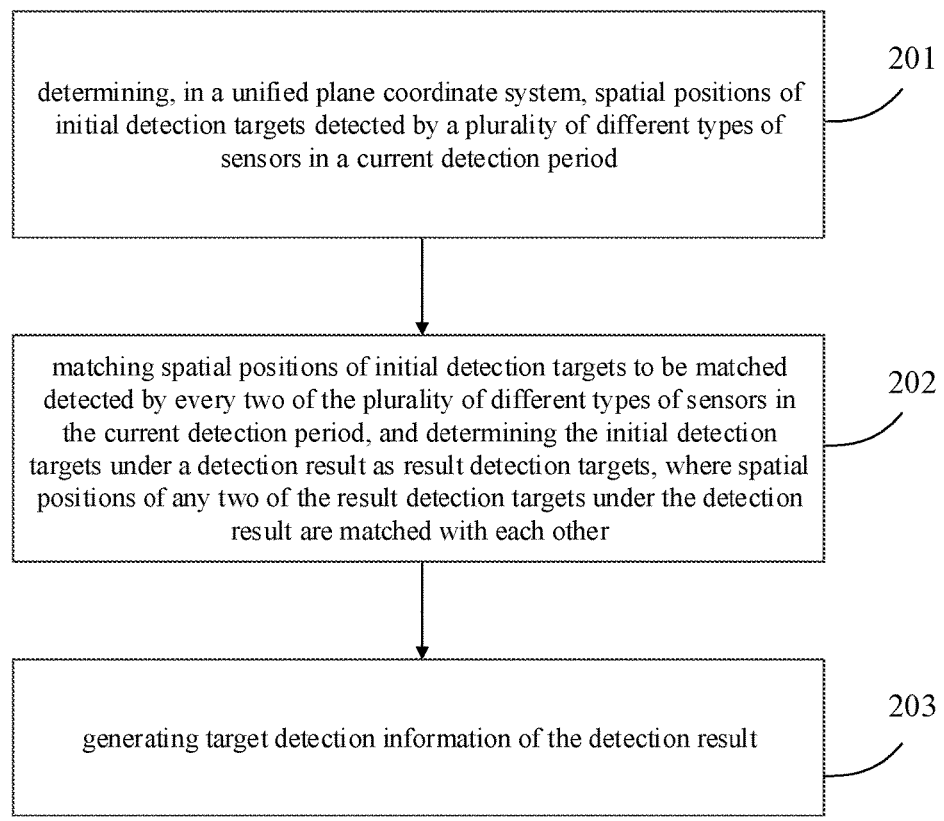
FIG. 2 is a schematic flowchart of a method for generating target detection information according to an embodiment of the present disclosure.

FIG. 2 illustrates a schematic flowchart of a method for generating target detection information according to an embodiment of the present disclosure. The method may include steps 201 to 203.

In step 201, spatial positions of initial detection targets detected by multiple different types of sensors in a current detection period are determined in a unified plane coordinate system.

Figure 3:
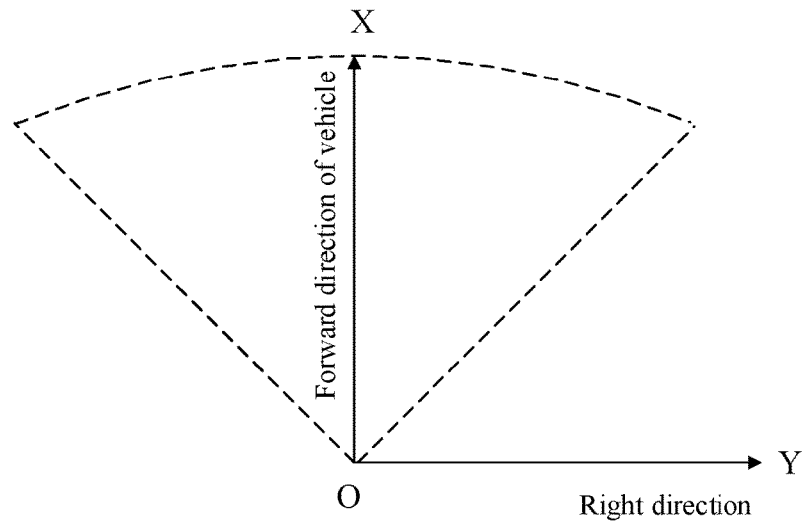
FIG. 3 is a schematic diagram of a plane coordinate system according to an embodiment of the present disclosure.

The spatial positions of the initial detection targets detected by different sensors are identified in independent coordinate systems of the different sensors, respectively, and the independent coordinate systems of the different sensors are usually different. In order to determine initial detection targets representing a same target object by analyzing relations among the spatial positions of the initial detection targets detected by the different sensors, a unified plane coordinate system is created and the spatial positions of the initial detection targets detected by the sensors are transformed into the unified plane coordinate system. For example, the unified plane coordinate system may adopt the coordinate system shown in FIG. 3. In the coordinate system in FIG. 3, a coordinate plane of the coordinate system example is defined by a roll axis and a pitch axis of the vehicle, an origin O of the coordinate system denotes a scanning midpoint of the sensor, a positive direction of an X-axis of the coordinate system is a forward direction of the vehicle, and a positive direction of a Y-axis of the coordinate system is a right direction perpendicular to the forward direction of the vehicle.

The sensor commonly used for detecting target objects around the vehicle may be a camera, a radar, a laser radar and the like. In the embodiment, multiple different types of sensors may include for example a camera, a radar and/or a laser radar.

In step 202, spatial positions between the initial detection targets to be matched detected by every two different sensors in a current detection period is matched, and the initial detection targets under a detection result are determined as result detection targets, wherein spatial positions of any two of the result detection targets under the detection result are matched with each other.

In the embodiment, one detection result corresponds to one target object around the vehicle. The initial detection targets under a detection result may be understood as detection targets obtained by detecting a same target object by different types of sensors. The spatial positions of the initial detection targets which are obtained by detecting a same target by the different types of sensors, may be slightly different in the unified plane coordinate system. If spatial positions of initial detection targets detected by two different sensors are close to each other, the spatial positions of the two initial detection targets can be regarded to be matched with each other, and the two initial detection targets can be regarded as targets obtained by detecting a same target object by different sensors. That is, the two initial detection targets represent a same target object, and are under a same detection result. Therefore, in the step 202, for all initial detection targets to be matched, the spatial position matching is performed between the initial detection targets to be matched detected by every two different types of sensors. If spatial positions of the two initial detection targets to be matched are matched with each other, it is determined that the two initial detection targets to be matched correspond to a same detection result. In this way, initial detection targets under a same detection result can be determined according to results of matching spatial positions of all initial detection targets to be matched.

For example, a target object is detected by three types of sensors, which are a camera, a radar and a laser radar. Initial detection targets detected by the camera include A and B, initial detection targets detected by the radar include C and D, and initial detection targets detected by the laser radar include E and F; and the initial detection targets to be matched include A, B, C, D, E and F. In matching spatial positions between the initial detection targets to be matched detected by different sensors, spatial position matching is performed between A and C, spatial position matching is performed between A and D, spatial position matching is performed between A and E, spatial position matching is performed between A and F, spatial position matching is performed between B and C, spatial position matching is performed between B and D, spatial position matching is performed between B and E, spatial position matching is performed between B and F, spatial position matching is performed between C and E, spatial position matching is performed between C and F, spatial position matching is performed between D and E, and spatial position matching is performed between D and F. In a case that the spatial position of A and the spatial position of C are matched with each other, the spatial position of C and the spatial position of F are matched with each other, and the spatial position of A and the spatial position of F are matched with each other, it is determined that A, C and F are initial detection targets in a same detection result representing a same target object, and A, C and F are determined as result detection targets in the detection result. That is, the spatial position of each initial detection target to be matched detected by each of the plurality of different types of sensors is matched with the spatial position of each initial detection target to be matched detected by each of others of the plurality of different types of sensors, to determine initial detection target under a same detection result.

For example, the distance between spatial positions of different initial detection targets may be indicated by a Euclidean distance. Therefore, the spatial positions of the two initial detection targets to be matched may be matched according to the Euclidean distance between the two initial detection targets in the unified plane coordinate system. If the Euclidean distance between the spatial positions of the two initial detection targets is small, the two initial detection targets is regarded as representing a same target object, and it can be determined that the two initial detection targets are initial detection targets under a same detection result. That is, it is determined that the spatial positions of the two initial detection targets to be matched are matched with each other if the Euclidean distance between the spatial positions of the two initial detection targets is within a preset distance threshold.

Figure 6:
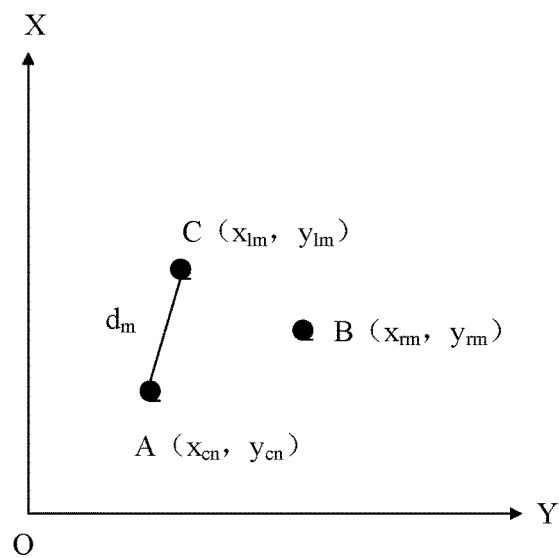
FIG. 6 is a schematic diagram of spatial positions of initial detection targets detected by different sensors in a unified plane coordinate system according to an embodiment of the present disclosure.

For example, as shown in FIG. 6, A $(x_{cn}, y_{cn})$ denotes an initial detection target detected by the camera, B $(x_{rm}, y_{rm})$ denotes an initial detection target detected by the radar, and C $(x_{lm}, y_{lm})$ denotes an initial detection target detected by the laser radar. A Euclidean distance between spatial positions of the two initial detection targets A and B to be matched may be calculated according to a formula as follows.

$$d_m = \sqrt{(x_{rm}-x_{cn})^2 + (y_{rm}-y_{cn})^2}$$

where $d_m$ denotes a Euclidean distance between spatial positions of A and B, $x_{rm}$ denotes an x-coordinate of the spatial position of the initial detection target detected by the radar, $x_{cn}$ denotes an x-coordinate of the spatial position of the initial detection target detected by the camera, $y_{rn}$ denotes a y-coordinate of the spatial position of the initial detection target detected by the radar, and $y_{cn}$ denotes a y-coordinate of the spatial position of the initial detection target detected by the camera. If $d_m$ is less than a preset distance threshold D, it is determined that the spatial position of the initial detection target A detected by the radar and the spatial position of the initial detection target B detected by the camera are matched with each other. The preset distance threshold D should be less than the minimum distance between different target objects, to prevent successful match between spatial positions of initial detection targets corresponding to different target objects. If the spatial positions of A and B are matched with each other, the spatial positions of B and C are matched with each other, and the spatial positions of A and C are matched with each other, it is determined that A, B and C represent a same target object, that is, A, B and C are initial detection targets under a same detection result.

In addition, there are usually a large number of target objects that are detected by the sensors, which results in a large amount of processing for spatial matching. In some embodiments of the present disclosure, in order to reduce the amount of processing for spatial matching, a screening range is formed based on positions where the vehicle can arrive within a reaction time of a driver, and spatial matching is performed between only initial detection targets detected by different types of sensors within the screening range. Before step S202, the method may further include: determining a screening range in the unified plane coordinate system based on the current speed of the vehicle; and determining initial detection targets whose spatial positions are within the screening range as initial detection targets to be matched. The spatial positions of the initial detection targets to be matched are located within the screening range.

Figure 4:
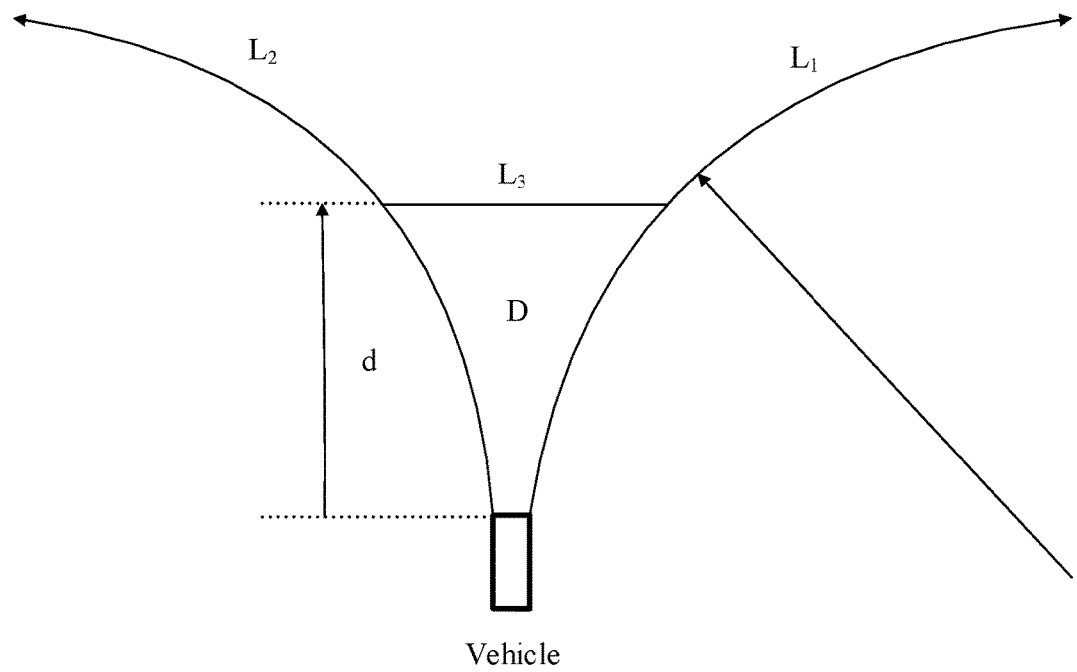
FIG. 4 is a schematic diagram of a screening range according to an embodiment of the present disclosure.

In an implementation, the screening range may be determined according to the minimum turning radius of the vehicle in the current position and the farthest path within the reaction time of the driver. In one aspect, considering that the vehicle has a lateral acceleration when turning at the current speed, the lateral acceleration of the vehicle may be limited to a value within a lateral acceleration threshold, to ensure driving safety and traveling comfort. In this case, the minimum turning radius of the vehicle at the current position can be obtained based on the lateral acceleration threshold and the current speed of the vehicle, and the minimum turning radius may be used as the current radius threshold. If the lateral acceleration of the vehicle is not greater than the lateral acceleration threshold, the turning radius of the vehicle is not less than the current radius threshold, therefore the turning radius corresponding to the screening range is not less than the current radius threshold. In another aspect, considering that the driver has a reaction time when driving the vehicle, the target objects to be matched are mainly target objects which may be collided by the vehicle in the reaction time of the driver. Therefore, a preset time threshold is used to represent the reaction time of the driver, and the farthest path of the vehicle at the current position within the reaction time of the driver can be obtained according to the preset time threshold and the current speed of the vehicle. The farthest path may be used as the current path threshold. If the reaction time is not greater than the preset time threshold, the driving path of the vehicle is not greater than the current path threshold, therefore the path corresponding to the screening range is not greater than the current path threshold. In conjunction with the two aspects above, the screening range may be a range of all possible spatial positions passed by the vehicle in a case that the turning radius exceeds the current radius threshold and the path does not exceed the current path threshold. The current radius threshold is determined based on the current speed of the vehicle and the lateral acceleration threshold, and the current path threshold is determined based on the current speed of the vehicle and the preset time threshold. For example, as an example of the screening range shown in FIG. 4, the screening range D is an area surrounded by two curves $L_1$ and $L_2$ and a straight line $L_3$. Curvature radiuses of the two curves are the current radius threshold, and the air line distance between the straight line $L_3$ and the current position of the vehicle is the current path threshold.

The current radius threshold and the current path threshold may be calculated according to formulas as follows.

$$\text{Radius} = \frac{V_x^2}{A_y}; \quad d = V_x \times t_{reaction}$$

where Radius denotes the current radius threshold, $V_x$ denotes the current speed of the vehicle, $A_y$ denotes the lateral acceleration threshold, d denotes the current path threshold, and $t_{reaction}$ denotes the preset time threshold.

Figure 5:
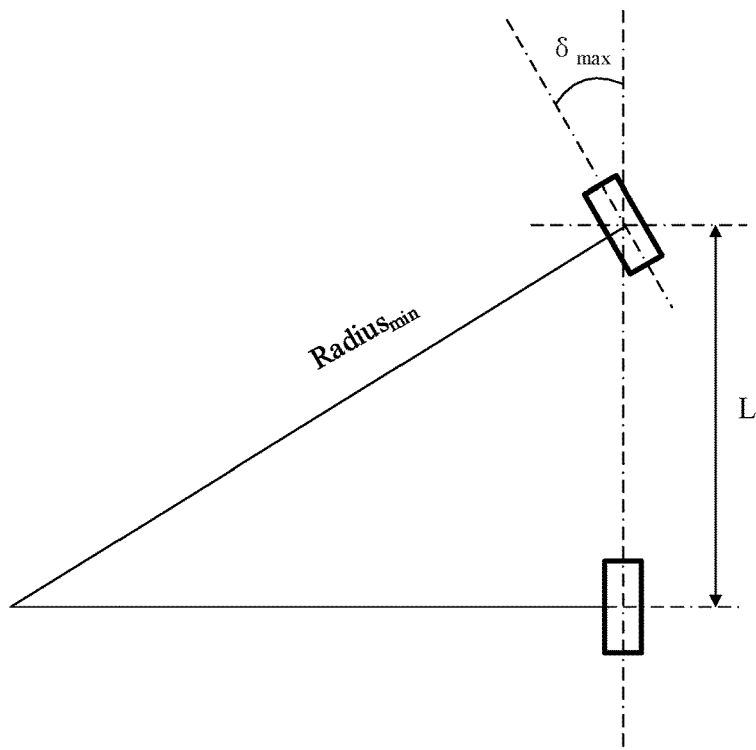
FIG. 5 is a schematic diagram of a turning radius of a vehicle when the vehicle is in the maximum turning angle according to an embodiment of the present disclosure.

In addition, the current turning radius may be determined based on a maximum turning angle of the vehicle. As shown in FIG. 5, $\delta_{max}$ denotes a maximum turning angle of turning system of the vehicle, L is a wheelbase, $\text{Radius}_{min}$ may be a minimum turning radius of the vehicle, therefore $$\text{Radius}_{min} = \frac{L}{\sin(\delta_{max})}$$

In step 203, target detection information of the detection result is generated. The target detection information of the detection result includes target detection information on each of the result detection targets, which is collected by the sensor detecting the result detection target in a dimension corresponding to the sensor. The result detection targets are the initial detection targets detected by the sensors.

Commonly used on-vehicle sensors for sensing ambient environment include a camera, a radar, a laser radar and the like. The camera can depict, for example, appearance and shape of the detected target by visual imaging. The radar can obtain an orientation of the detected target and a relative speed of the detected target with respect to the vehicle by comparing characteristics of transmitted electromagnetic wave with characteristics of received electromagnetic wave. The laser radar can obtain a profile of the detected target by laser beam scanning. In the embodiment, the multiple different types of sensors may include for example the camera, the radar and/or the laser radar. A dimension corresponding to the camera may be an image characteristic of the detected target, a dimension corresponding to the radar may be a relative speed of the detected target with respect to the vehicle, and a dimension corresponding to the laser radar may be a profile of the detected target. As an example, in a case that a same target object is detected by the camera, the radar or the laser radar when the vehicle is running, the target detection information of the detection result representing the target object may include an image characteristic (for example, a geometric characteristic) of the target object detected by the camera, a relative speed of the target object with respect to the vehicle detected by the radar, and a profile of the target object detected by the laser radar.

In some embodiments, in order to determine whether all result detection targets under the detection result can represent a same target object based on the target detection information of the detection result, the target detection information of the detection result may further include a spatial matching confidence of the detection result in the current detection period. In this case, before the step S203, the method according to the embodiment may further include: calculating a spatial matching confidence of the detection result in the current detection period based on the number of successful matches among the spatial positions of all the result detection targets in the current detection period.

The spatial matching confidence of the detection result in the current detection period refers to a possibility that the initial detection targets under the detection result in the current detection period represents a same target object from a spatial position perspective. The spatial matching confidence of the detection result in the current detection period may be for example a ratio of the number of matches corresponding to the detection result to the total number of matches. The number of matches corresponding to the detection result is the number of successful matches among the spatial positions of all the result detection targets in the current detection period, and the total number of matches is the number of matches between all initial detection targets to be matched in the current detection period, i.e., including all successful matches and unsuccessful matches.

For example, assumed that two sensors which are a camera and a radar are used to detect a target object. Initial detection targets detected by the camera include A and B, and initial detection targets detected by the radar include C and D, then initial detection targets to be matched may include A, B, C and D. Since spatial position matching is performed between initial detection targets to be matched detected by different sensors, spatial position matching is performed between A and C, spatial position matching is performed between A and D, spatial position matching is performed between B and C, and spatial position matching is performed between B and D. In this case, the number of matches among the initial detection targets to be matched is 4, that is, the total number of matches is 4. Assumed that the spatial position of A is matched with the spatial position of C, the spatial position of A is not matched with the spatial position of D, the spatial position of B is not matched with the spatial position of C, and the spatial position of B is not matched with the spatial position of D, then in this case, A and C is result detection targets in a same detection result. Therefore, the number of successful matches among the spatial positions of all the result detection targets is 1, that is, the number of matches corresponding to the detection result is 1.

In some embodiments, target detection information including information detected by different sensors is generated only for a detection result having a high spatial matching confidence. In this case, step 203 may include: generating target detection information of a detection result in a case that the spatial matching confidence of the detection result in the current detection period is greater than a preset spatial confidence threshold.

In some embodiments, in order to determine whether detection results in different detection periods can indicate a same target object based on the target detection information of the detection result, the target detection information of the detection result may further include a time matching confidence of the detection result. In this case, before step 203, the method according to the embodiment may further include: determining a time matching confidence of the detection result by performing a weighting operation on spatial matching confidences of the detection result in multiple recent detection periods.

By using different sensors to detect target objects in different detection periods, detected initial detection targets to be matched may be different, and spatial matching confidences of the detection result in different detection periods may be different. In order to determine whether the detection result in different detection periods represent a same target object, the spatial matching confidences of the detection result in multiple different detection periods may be traced, to obtain a time matching confidence of the detection result. The time matching confidence of the detection result refers to a possibility that the detection result in multiple different detection periods represents a same target object from time perspective.

In some embodiments, target detection information including information detected by different sensors is generated only for a detection result having a high time matching confidence. In this case, step 203 may further include: generating the target detection information of the detection result in a case that the time matching confidence of the detection result is greater than a preset time confidence threshold.

In some embodiments, the time matching confidence of the detection result may be determined by multiplying a spatial matching confidence in each of the multiple recent detection periods with a weighting coefficient corresponding to the detection period and adding the obtained products together. The closer the detection period is to a current time instant, the greater the weighting coefficient corresponding to the detection period is. In an implementation, the weighting coefficient corresponding to each detection period may be a normalized weighting coefficient, that is, the sum of weighting coefficients corresponding to all the multiple recent detection periods is equal to 1.

In an implementation, the time matching confidence may be calculated according to a formula as follows.

$$P_{tracking} = \frac{m}{2m}P_L(c) + \frac{m-1}{2m}P_L(c-1) + \ldots + \frac{m-(m-1)}{2m}P_L(c-(m-1))$$

where $P_{tracking}$ denotes the time matching confidence; c, c−1 . . . c−(m−1) denote a current detection period, a first detection period before the current detection period . . . a (m−1)th detection period before the current detection period, respectively, which are m recent detection periods; $P_L(c)$, $P_L(c-1)$ . . . $P_L(c-(m-1))$ denote spatial matching confidences of the $$\frac{m}{2m}, \frac{m-1}{2m} \ldots \frac{m-(m-1)}{2m}$$

detection result in the m recent detection periods, respectively, m is a positive integer, denote weighting coefficients corresponding to the m recent detection periods, respectively.

According to the embodiments of the present disclosure, target objects around the vehicle are detected by multiple different types of sensors, and the detection targets representing a same target object, which are detected by the different types of sensors, are determined by spatial position matching. With taking the target object as a detection result, the target detection information generated for the detection result includes a spatial matching confidence of the detection result in the current detection period, a time matching confidence of the detection result, and target detection information on each of the detection targets representing the detection result, where the target detection information on the detection target is collected by the sensor detecting the detection target in a dimension corresponding to the sensor. It can be seen that, on one hand, the possibility that the detection targets detected by different types of sensors presents a same target object can be determined according to the spatial matching confidence and the time matching confidence, and false detection or missing detection for the target object is greatly reduced in view of different advantages of different sensors. On the other hand, according to the dimensions of the target detection information that can be accurately collected by the different types of sensors, target detection information accurately collected by different types of sensors in different dimensions is fused to obtain target detection information on the same target object, thereby providing more accurate and completer target detection information on the target object.

Figure 7:
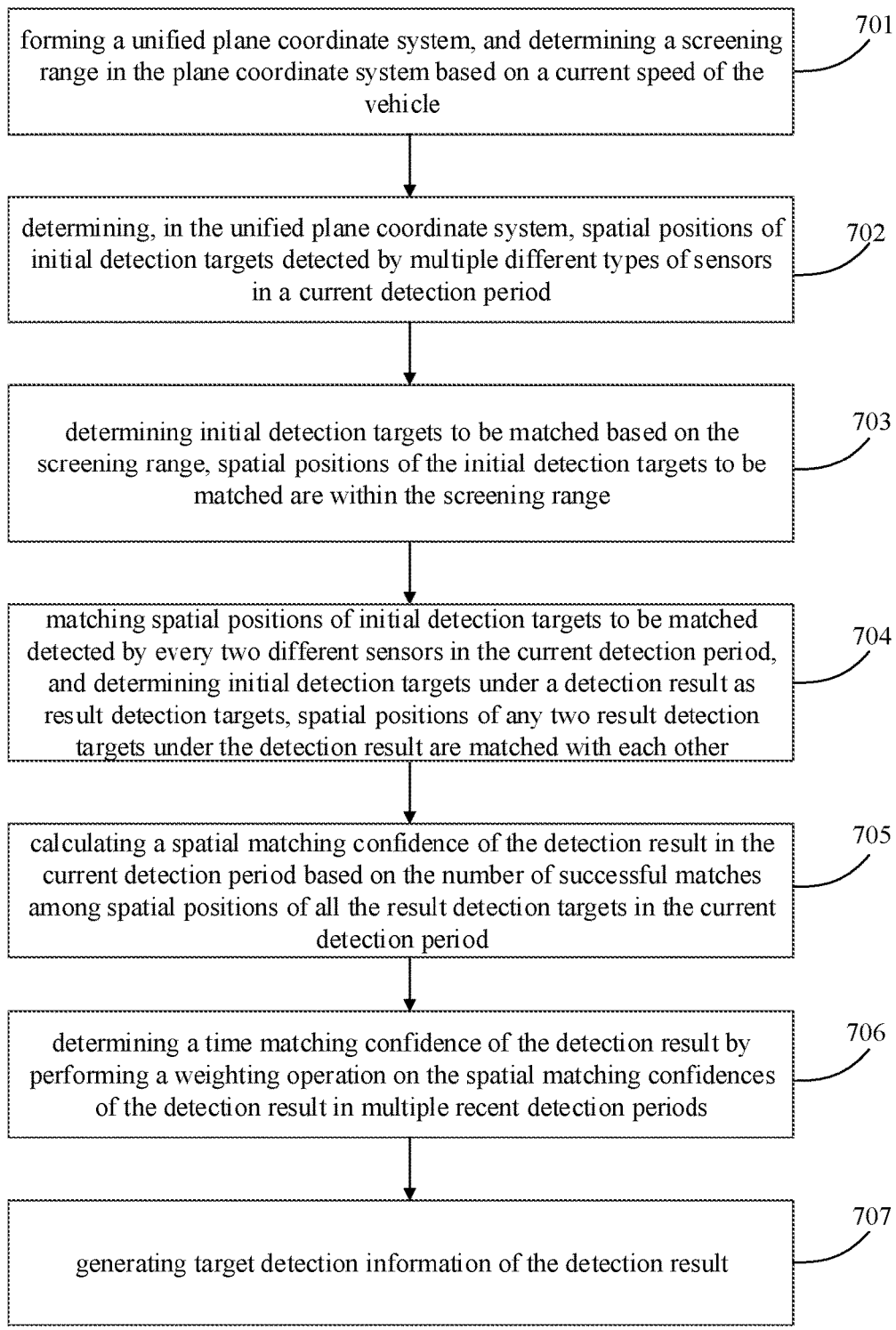
FIG. 7 is a schematic flowchart of a method for generating target detection information according to an embodiment of the present disclosure.

FIG. 7 is a schematic flowchart of another method for generating target detection information according to an embodiment of the present disclosure. In the embodiment, the method may include step 701 to step 707.

In step 701, a unified plane coordinate system is formed, and a screening range is determined in the plane coordinate system based on a current speed of a vehicle.

In step 702, spatial positions of initial detection targets detected by multiple different types of sensors in a current detection period are determined in the unified plane coordinate system.

In step 703, initial detection targets to be matched are determined based on the screening range. Spatial positions of the initial detection targets to be matched are located within the screening range.

In step 704, spatial positions of initial detection targets to be matched detected by every two different sensors in the current detection period are marched, and initial detection targets under a detection result are determined as result detection targets. Spatial positions of any two result detection targets under the detection result are matched with each other.

In step 705, a spatial matching confidence of the detection result in the current detection period is calculated based on the number of successful matches among spatial positions of all the result detection targets in the current detection period.

In step 706, a time matching confidence of the detection result is determined by performing a weighting operation on the spatial matching confidences of the detection result in multiple recent detection periods.

In step 707, target detection information of the detection result is generated. The target detection information of the detection result includes the spatial matching confidence of the detection result in the current detection period, the time matching confidence of the detection result, and target detection information on each of the result detection targets, which is detected by the sensor detecting the result detection target in a dimension corresponding to the sensor. Each of the result detection targets is the initial detection target detected by the sensor.

According to the embodiments of the present disclosure, target objects around the vehicle are detected by multiple different types of sensors, and the detection targets representing a same target object, which are detected by the different types of sensors, are determined by spatial position matching. With taking the target object as a detection result, the target detection information generated for the detection result includes a spatial matching confidence of the detection result in the current detection period, a time matching confidence of the detection result, and target detection information on each of the detection targets representing the detection result, where the target detection information on the detection target is collected by the sensor detecting the detection target in a dimension corresponding to the sensor. It can be seen that, on one hand, the possibility that the detection targets detected by different types of sensors presents a same target object can be determined according to the spatial matching confidence and the time matching confidence, and false detection or missing detection for the target object is greatly reduced in view of different advantages of different sensors. On the other hand, according to the dimensions of the target detection information that can be accurately collected by the different types of sensors, target detection information accurately collected by different types of sensors in different dimensions is fused to obtain target detection information on the same target object, thereby providing more accurate and completer target detection information on the target object.

Exemplary Device

Figure 8:
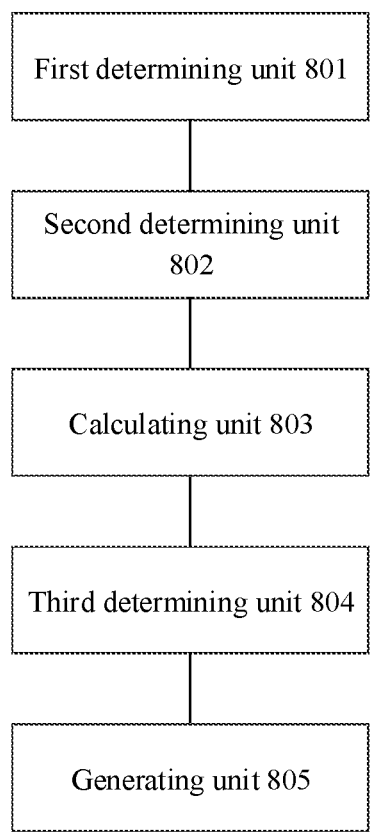
FIG. 8 is a schematic structural diagram of an apparatus for generating target detection information according to an embodiment of the present disclosure.

FIG. 8 is a schematic structural diagram of an apparatus for generating target detection information according to an embodiment of the present disclosure. In the embodiment, the apparatus may include a first determining unit 801, a second determining unit 802 and a generating unit 803.

The first determining unit 801 is configured to determine, in a unified plane coordinate system, spatial positions of initial detection targets detected by a plurality of different types of sensors in a current detection period.

The second determining unit 802 is configured to match spatial positions of initial detection targets to be matched detected by every two of the plurality of different types of sensors in the current detection period, and determine the initial detection targets under a detection result as result detection targets, wherein spatial positions of any two of the result detection targets under the detection result are matched with each other.

The generating unit 803 is configured to generate target detection information of the detection result, wherein the target detection information of the detection result comprises target detection information on each of the result detection targets, which is collected by the sensor detecting the result detection target in a dimension corresponding to the sensor, and each of the result detection targets is the initial detection target detected by the sensor.

Optionally, the apparatus may further include a calculating unit.

The calculating unit is configured to calculate a spatial matching confidence of the detection result in the current detection period based on the number of successful matches among the spatial positions of all the result detection targets in the current detection period.

The target detection information of the detection result further includes the spatial matching confidence of the detection result in the current detection period.

Optionally, the generating unit 803 is configured to generate target detection information of the detection result in a case that the spatial matching confidence of the detection result in the current detection period is greater than a preset spatial confidence threshold.

Optionally, the apparatus may further include a third determining unit, configured to determine a time matching confidence of the detection result by performing a weighting operation on spatial matching confidences of the detection result in multiple recent detection periods.

The target detection information of the detection result further includes the time matching confidence of the detection result.

Optionally, the generating unit 803 is configured to generate target detection information of the detection result in a case that the time matching confidence of the detection result is greater than a preset time confidence threshold.

Optionally, in a case that a Euclidean distance between spatial positions of two initial detection targets to be matched is within a preset distance threshold, it is determined that the spatial positions of the two initial detection targets to be matched are matched with each other.

Optionally, the apparatus may further include: a fourth determining unit configured to determine a screening range in the plane coordinate system based on a current speed of vehicle; and a fifth determining unit configured to determine initial detection targets to be matched based on the screening range. Spatial positions of the initial detection targets to be matched are located within the screening range.

Optionally, the screening range is a range of all possible spatial positions passed by the vehicle in a case that a turning radius of the vehicle exceeds a current radius threshold and a path of the vehicle does not exceed a current path threshold. The current radius threshold is determined based on the current speed of the vehicle and a lateral acceleration threshold, and the current path threshold is determined based on the current speed of the vehicle and a preset time threshold.

Optionally, the spatial matching confidence of the detection result in the current detection period may be a ratio of the number of successful matches corresponding to the detection result to the total number of matches, wherein the number of successful matches corresponding to the detection result is the number of successful matches among the spatial positions of all the result detection targets in the current detection period, and the total number of matches is the number of matches among all the initial detection targets to be matched in the current detection period.

Optionally, the third determining unit is configured to add results obtained by multiplying a spatial matching confidence in each of the plurality of recent detection periods by a weighting coefficient corresponding to the detection period, to obtain the time matching confidence of the detection result. The closer the detection period is to a current time instant, the greater the weighting coefficient corresponding to the detection period is Optionally, the weighting coefficient corresponding to each of the detection periods may be a normalized weighting coefficient.

Optionally, the multiple different types of sensors include a camera, a radar and/or a laser radar. A dimension corresponding to the camera may be an image characteristic of the detected target object, a dimension corresponding to the radar may be a relative speed of the detected target object with respect to the vehicle, and a dimension corresponding to the laser radar may be a profile of the detected target object.

According to the embodiments of the present disclosure, target objects around the vehicle are detected by multiple different types of sensors, and the detection targets representing a same target object, which are detected by the different types of sensors, are determined by spatial position matching. With taking the target object as a detection result, the target detection information generated for the detection result includes a spatial matching confidence of the detection result in the current detection period, a time matching confidence of the detection result, and target detection information on each of the detection targets representing the detection result, where the target detection information on the detection target is collected by the sensor detecting the detection target in a dimension corresponding to the sensor. It can be seen that, on one hand, the possibility that the detection targets detected by different types of sensors presents a same target object can be determined according to the spatial matching confidence and the time matching confidence, and false detection or missing detection for the target object is greatly reduced in view of different advantages of different sensors. On the other hand, according to the dimensions of the target detection information that can be accurately collected by the different types of sensors, target detection information accurately collected by different types of sensors in different dimensions is fused to obtain target detection information on the same target object, thereby providing more accurate and completer target detection information on the target object.

Figure 9:
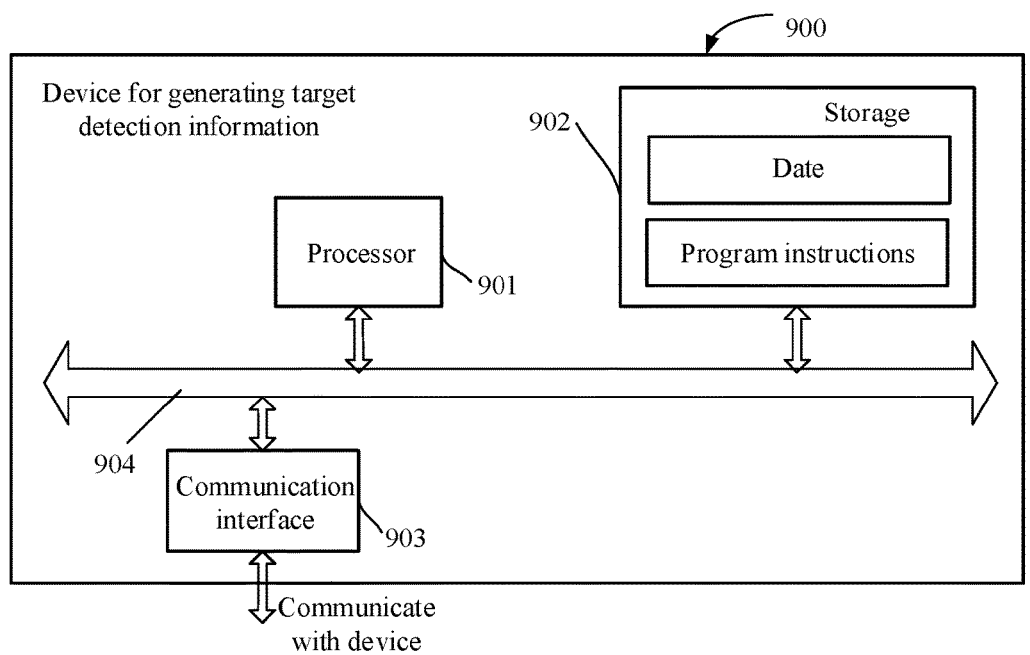
FIG. 9 is a schematic structural diagram of a device for generating target detection information according to an embodiment of the present disclosure.

FIG. 9 is a schematic structural diagram of a device for generating target detection information according to an embodiment of the present disclosure. In the embodiment, the device 900 may include a processor 901, a storage 902, a communication interface 903 and a bus system 904.

The bus system 904 is configured to couple all hardware components of the device together.

The communication interface 903 is configured to implement communication connection between the device and at least one other device.

The storage 902 is configured to store program instructions and data.

The processor 901 is configured to read the instructions and date stored in the storage 902, to perform steps of:

determining, in a unified plane coordinate system, spatial positions of initial detection targets detected by a plurality of different types of sensors in a current detection period;

matching spatial positions of initial detection targets to be matched detected by every two of the plurality of different types of sensors in the current detection period, and determining the initial detection targets under a detection result as result detection targets, wherein spatial positions of any two of the result detection targets under the detection result are matched with each other; and generating target detection information of the detection result, wherein the target detection information of the detection result comprises target detection information on each of the result detection targets, which is collected by the sensor detecting the result detection target in a dimension corresponding to the sensor, and each of the result detection targets is the initial detection target detected by the sensor.

Optionally, the processor 901 may be further configured to calculate a spatial matching confidence of the detection result in the current detection period based on the number of successful matches among the spatial positions of all the result detection targets in the current detection period. The target detection information of the detection result further includes the spatial matching confidence of the detection result in the current detection period.

Optionally, in order to generate the target detection information of the detection result, the processor 901 may be further configured to generate target detection information of the detection result in a case that the spatial matching confidence of the detection result in the current detection period is greater than a preset spatial confidence threshold.

Optionally, the processor 901 may be further configured to determine a time matching confidence of the detection result by performing a weighting operation on spatial matching confidences of the detection result in multiple recent detection periods. The target detection information of the detection result further includes the time matching confidence of the detection result.

Optionally, in order to generate the target detection information of the detection result, the processor 901 may be further configured to generate the target detection information of the detection result in a case that the time matching confidence of the detection result is greater than a preset time confidence threshold.

Optionally, in a case that a Euclidean distance between spatial positions of two initial detection targets to be matched is within a preset distance threshold, it is determined that the spatial positions of the two initial detection targets to be matched are matched with each other.

Optionally, the processor 901 may be further configured to: determine a screening range in the plane coordinate system based on a current speed of the vehicle; and determine the initial detection targets to be matched based on the screening range. Spatial positions of the initial detection targets to be matched are located within the screening range.

Optionally, the screening range is a range of all possible spatial positions passed by the vehicle in a case that a turning radius of the vehicle does not exceed a current radius threshold and a path of the vehicle does not exceed a current path threshold. The current radius threshold is determined based on the current speed of the vehicle and a lateral acceleration threshold, and the current path threshold is determined based on the current speed of the vehicle and a preset time threshold.

Optionally, the spatial matching confidence of the detection result in the current detection period may be a ratio of the number of successful matches corresponding to the detection result to the total number of matches. The number of successful matches corresponding to the detection result is the number of successful matches among the spatial positions of all the result detection targets in the current detection period, and the total number of matches is the number of matches among all the initial detection targets to be matched in the current detection period.

Optionally, in order to determine the time matching confidence of the detection result, the processor 901 may be further configured to obtain the time matching confidence of the detection result by multiplying the spatial matching confidence in each of the multiple recent detection periods with a weighting coefficient corresponding to the detection period and adding the obtained products together. The closer the detection period is to a current time instant, the greater the weighting coefficient corresponding to the detection period is.

Optionally, the weighting coefficient corresponding to each of the detection periods is a normalized weighting coefficient.

Optionally, the multiple different types of sensors include a camera, a radar and/or a laser radar. A dimension corresponding to the camera may be an image characteristic of the detected target object, a dimension corresponding to the radar may be a relative speed of the detected target object with respect to the vehicle, and a dimension corresponding to the laser radar may be a profile of the detected target object.

According to the embodiments of the present disclosure, target objects around the vehicle are detected by multiple different types of sensors, and the detection targets representing a same target object, which are detected by the different types of sensors, are determined by spatial position matching. With taking the target object as a detection result, the target detection information generated for the detection result includes a spatial matching confidence of the detection result in the current detection period, a time matching confidence of the detection result, and target detection information on each of the detection targets representing the detection result, where the target detection information on the detection target is collected by the sensor detecting the detection target in a dimension corresponding to the sensor. It can be seen that, on one hand, the possibility that the detection targets detected by different types of sensors presents a same target object can be determined according to the spatial matching confidence and the time matching confidence, and false detection or missing detection for the target object is greatly reduced in view of different advantages of different sensors. On the other hand, according to the dimensions of the target detection information that can be accurately collected by the different types of sensors, target detection information accurately collected by different types of sensors in different dimensions is fused to obtain target detection information on the same target object, thereby providing more accurate and completer target detection information on the target object.

"First" in the terms such as "a first determining unit" in the embodiments of the present disclosure is only used as a name identifier and not indicate first in an order. This rule also adapts to "second" and "third" and so on.

According to the description of the above embodiments, those skilled in the art may clearly know that all or a part of steps in the methods according to the above embodiments may be performed by means of software in combination with a general-purpose hardware platform. Based on such understanding, the technical solution of the present disclosure may be embodied as a computer software product, and the computer software product may be stored in a storage medium such as a read-only memory (ROM)/RAM, a magnetic disk and an optical disk. The computer software product includes several instructions to enable a computer device (which may be a personal computer, a server or a network communication apparatus such as a router) to perform the methods described according to the embodiments of the present disclosure or some parts of the embodiments.

Various embodiments in the specification are described in a progressive manner, and each embodiment lays emphasis on differences from other embodiments. For the same or similar parts between the embodiments, one may refer to the description of other embodiments. For the method embodiments and the device embodiments, since they are similar to the system embodiment, the description thereof is simple. For the part of the method embodiment and the apparatus embodiment related to the system embodiment, one may refer to the description of the system embodiment. The device embodiments and system embodiments described above are only schematic, the modules shown as separate components may be physically separated or not, and components displayed as modules may be physical modules or not, that is, the components may be located at a same place or distributed to multiple network units. The solutions of the embodiment may be achieved by selecting a part or all of the modules as needed. Those skilled in the art may understand and practice the present disclosure without any creative work.

Only the preferred embodiments of the present disclosure are described above and are not used to limit the protection scope of the present disclosure. It should be noted that, those skilled in the art may make several improvements and modifications without departing the scope of the present disclosure, and the improvements and modifications should be regarded as falling within the protection scope of the present disclosure.

The invention claimed is:

1. A method for generating target detection information, comprising:
   determining, in a unified plane coordinate system, spatial positions of initial detection targets detected by a plurality of different types of sensors in a current detection period;
   matching spatial positions of initial detection targets to be matched detected by every two of the plurality of different types of sensors in the current detection period, and determining the initial detection targets under a detection result as result detection targets, wherein spatial positions of any two of the result detection targets under the detection result are matched with each other; and
   generating target detection information of the detection result, wherein the target detection information of the detection result comprises target detection information on each of the result detection targets, which is collected by the sensor detecting the result detection target in a dimension corresponding to the sensor, and wherein each of the result detection targets is the initial detection target detected by the sensor.

2. The method according to claim 1, further comprising:
   calculating a spatial matching confidence of the detection result in the current detection period based on the number of successful matches among the spatial positions of all the result detection targets in the current detection period, wherein the target detection information of the detection result further comprises the spatial matching confidence of the detection result in the current detection period.

3. The method according to claim 2, wherein generating target detection information of the detection result comprises:
   generating the target detection information of the detection result in a case that the spatial matching confidence of the detection result in the current detection period is greater than a preset spatial confidence threshold.

4. The method according to claim 2, further comprising:
   determining a time matching confidence of the detection result by performing a weighting operation on spatial matching confidences of the detection result in a plurality of recent detection periods, wherein the target detection information of the detection result further comprises the time matching confidence of the detection result.

5. The method according to claim 4, wherein generating target detection information of the detection result comprises: generating the target detection information of the detection result in a case that the time matching confidence of the detection result is greater than a preset time confidence threshold.

6. The method according to claim 4, wherein determining the time matching confidence of the detection result by performing the weighting operation on the spatial matching confidences of the detection result in the plurality of recent detection periods comprises:
   adding results obtained by multiplying a spatial matching confidence in each of the plurality of recent detection periods by a weighting coefficient corresponding to the detection period, to obtain the time matching confidence of the detection result, wherein the closer the detection period is to a current time instant, the greater the weighting coefficient corresponding to the detection period is.

7. The method according to claim 6, wherein the weighting coefficient corresponding to each of the detection periods is a normalized weighting coefficient.

8. The method according to claim 2, wherein the spatial matching confidence of the detection result in the current detection period is a ratio of the number of successful matches corresponding to the detection result to the total number of matches, wherein the number of successful matches corresponding to the detection result is the number of successful matches among the spatial positions of all the result detection targets in the current detection period, and the total number of matches is the number of matches among all the initial detection targets to be matched in the current detection period.

9. The method according to claim 1, wherein it is determined that spatial positions of two of the initial detection targets to be matched are matched with each other, in a case that a Euclidean distance between the spatial positions of the two of the initial detection targets to be matched is within a preset distance threshold.

10. The method according to claim 1, further comprising:
    determining a screening range in the plane coordinate system based on a current speed of a vehicle; and
    determining the initial detection targets to be matched based on the screening range, wherein spatial positions of the initial detection targets to be matched are within the screening range.

11. The method according to claim 10, wherein the screening range is a range of all spatial positions able to be passed by the vehicle in a case that a turning radius exceeds a current radius threshold and a path does not exceed a current path threshold, wherein the current radius threshold is determined based on the current speed of the vehicle and a lateral acceleration threshold, and the current path threshold is determined based on the current speed of the vehicle and a preset time threshold.

12. The method according to claim 1, wherein the multiple different types of sensors comprises at least one of a camera, a radar and a laser radar, a dimension corresponding to the camera is an image characteristic of a detected target object, a dimension corresponding to the radar is a relative speed of the detected target object with respect to the vehicle, and a dimension corresponding to the laser radar is a profile of the detected target object.

13. An apparatus for generating target detection information, comprising:
    a first determining unit configured to determine, in a unified plane coordinate system, spatial positions of initial detection targets detected by a plurality of different types of sensors in a current detection period;
    a second determining unit configured to match spatial positions of initial detection targets to be matched detected by every two of the plurality of different types of sensors in the current detection period, and determine the initial detection targets under a detection result as result detection targets, wherein spatial positions of any two of the result detection targets under the detection result are matched with each other; and a generating unit configured to generate target detection information of the detection result, wherein the target detection information of the detection result comprises target detection information on each of the result detection targets, which is collected by the sensor detecting the result detection target in a dimension corresponding to the sensor, and each of the result detection targets is the initial detection target detected by the sensor.

14. A device for generating target detection information, comprising a processor, a storage, a communication interface and a bus system, wherein the bus system is configured to couple the processor, the storage and the communication interface together;

the communication interface is configured to implement communication connection between the device and at least one other device;

the storage is configured to storage instructions; and the processor is configured to read the instructions stored in the storage, to perform steps of:

determining, in a unified plane coordinate system, spatial positions of initial detection targets detected by a plurality of different types of sensors in a current detection period;

matching spatial positions of initial detection targets to be matched detected by every two of the plurality of different types of sensors in the current detection period, and determining the initial detection targets under a detection result as result detection targets, wherein spatial positions of any two of the result detection targets under the detection result are matched with each other; and generating target detection information of the detection result, wherein the target detection information of the detection result comprises target detection information on each of the result detection targets, which is collected by the sensor detecting the result detection target in a dimension corresponding to the sensor, and each of the result detection targets is the initial detection target detected by the sensor.

* * * * *